United States Patent
Grob et al.

[11] 3,878,859
[45] Apr. 22, 1975

[54] ELECTROMAGNETIC VALVE

[75] Inventors: Alfred Grob, Oberstenfeld; Waldemar Hans; Helmut Staib, both of Bamberg, all of Germany

[73] Assignee: Robert Bosch G.m.b.H., Stuttgart, Germany

[22] Filed: Feb. 15, 1974

[21] Appl. No.: 443,152

[30] Foreign Application Priority Data
Mar. 28, 1973 Germany............................ 2315425

[52] U.S. Cl................................ 137/270; 251/129
[51] Int. Cl............................................ F16k 31/02
[58] Field of Search............ 137/270, 270.5, 269.5, 137/271, 269; 251/129, 361

[56] References Cited
UNITED STATES PATENTS

| | | | |
|---|---|---|---|
| 2,031,478 | 2/1936 | Gray | 251/129 X |
| 2,454,160 | 10/1948 | Greene | 251/361 |
| 2,930,404 | 3/1960 | Kowalski et al. | 251/129 X |
| 2,948,298 | 8/1960 | Gardner | 137/270.5 |
| 3,026,896 | 3/1962 | Bosworth et al. | 137/270 |
| 3,123,091 | 3/1964 | Elsey | 137/270 |

*Primary Examiner*—Martin P. Schwadron
*Assistant Examiner*—Robert J. Miller
*Attorney, Agent, or Firm*—Michael S. Striker

[57] ABSTRACT

A valve unit includes a valve housing formed with an interior passage which communicates with an inlet opening and an outlet opening. A valve assembly is accommodated in the passage and includes a sleeve formed with a valve seat and a valve element which is biased by a biasing spring and is shiftably accommodated in the passage. The valve assembly can be so positioned in the passage that in one orientation the valve element is permanently biased into engagement with the valve seat and in another orientation in which the valve element is permanently biased out of engagement with the valve seat. A drive unit is provided which includes a drive housing that is removably connected with the valve housing, and an electromagnetic drive which, when energized serves to shift the valve element in the passage counter to the biasing force of the spring.

15 Claims, 3 Drawing Figures

ELECTROMAGNETIC VALVE

BACKGROUND OF THE INVENTION

The present invention relates generally to a valve, and more particularly to an electromagnetic valve.

Electromagnetic valves are already well known in the art. One such valve is a three-way type having a pressure-equalized valve element accommodated in a sleeve which in turn is accommodated in a valve housing. The valve is operated by a solenoid the armature of which is fixedly connected with the valve element and pulls the same to an operative position. An equalizing channel of relatively small cross-section is formed directly in the valve element.

This prior-art construction has two disadvantages. One of these is the fact that the valve is not suitable for very rapid response times, for instance on the order of a few milliseconds, because of the small-diameter equalizing channel. Another and economically very important disadvantage is that the valve is suitable only for one mode of operation and cannot be adapted — i.e. by a simple reversing of some of its elements — for use either as a normally open or as a normally closed valve. Yet, in terms of a reduction of the inventory required, in terms of a simplification of the manufacture of valve components, and also in terms of the ready availability of one or the other type of valve this is most important to manufacturers and purchasers alike.

SUMMARY OF THE INVENTION

Accordingly, it is an object of the present invention to provide an electromagnetic valve which avoids the disadvantages of the prior art.

More particularly, it is an object of the present invention to provide an electromagnetic valve which can be modified to operate either as a normally open valve or as a normally closed valve by merely changing the position of some of its components, without having to employ additional components or discard any of the existing components.

Another object of the invention is to provide such an electromagnetic valve which is particularly suitable for high-pressure applications and which affords very short response times.

Still a further object of the invention is to provide such an improved electromagnetic valve which is largely pressure-equalized in all operating conditions.

In keeping with the above objects and with others which will become apparent hereafter, one feature of the invention resides in an electromagnetic valve, and briefly stated this valve comprises a valve unit including a valve housing formed with an interior passage which communicates with an inlet opening and outlet opening. A biasing spring is provided in the valve housing and a valve assembly — including valve seat means interposed in the passage, and a valve element biased by the biasing spring and shiftable accommodated in the passage — in positionable in the passage in one orientation in which the valve element is permanently biased into engagement with the valve seat means and in another orientation in which the valve element is permanently biased out of engagement with the valve seat means. A drive unit is provided including a valve housing removably connected with the valve housing and electromagnetic drive means in the drive housing and operative — when energized — for shifting the valve element in the passage counter to the biasing force of the spring.

With this construction, it is a simple matter to change the valve from a normally open configuration to a normally closed configuration merely by reversing the position of the valve seat means and the valve element in the valve housing.

Even if the pressures prevailing at the inlet and outlet openings are high, the novel valve can be connected in any desired manner with supply and user conduits, i.e., either the inlet or the outlet opening can be connected with the supply conduit or that the inlet or outlet opening can be connected with the user conduit, without the valve being influenced in its operational capability. Moreover, the valve is such that the various components can be very readily and very simply produced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
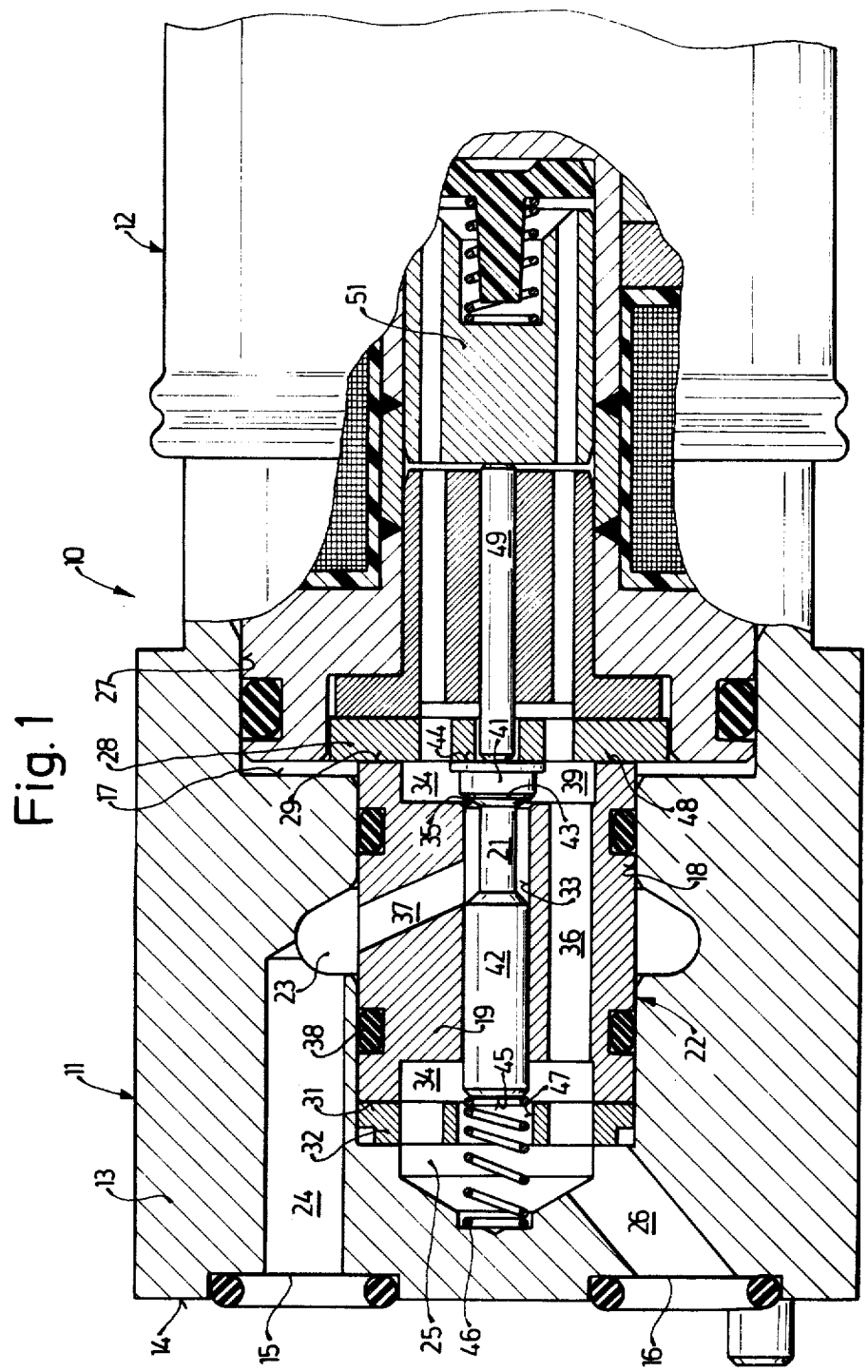
FIG. 1 is a fragmentary longitudinal section through a valve according to the present invention, being shown in a normally open configuration.

Discussing the drawing in detail, and referring firstly to FIG. 1, it will be seen that reference numeral 10 identifies an electromagnetic valve in toto. The valve is composed of a valve unit 11 and a discrete drive unit 12 which is releasably connected with the valve unit 11.

As the drawing shows, the valve unit 11 has a valve housing 13 which has a first end face 14 formed with a port 15 and another port 16. One of these will constitute an inlet opening and the other the outlet opening, it being understood that the particular function of the ports (i.e. whether the port is used as an inlet opening or an outlet opening) can be reversed without adverse effect on the operation of the valve. The housing 13 further has another end face 17 which is axially spaced from and located opposite the end face 14 and from which there extends inwardly a stepped passage or blind bore 18.

Accommodated in the passage 18 is a valve assembly composed of a sleeve 19, and a valve element 21. In the region where the valve assembly is located, the passage 18 is formed with an annular channel 23 which communicates with the port 15 by means of a bore 24 formed in the housing 13. A chamber 25 is formed between the valve assembly 22 and the valve housing 13, or more particularly the closed end of the blind bore 18; this chamber 25 is in communication with the port 17 via a further bore 26 formed in the housing 13.

An enlarged portion 27 of the bore or passage 18 sealingly accommodates (note the annular seal) a part of the drive unit 12, i.e. of the housing thereof which is not separately designated with a reference numeral. The drive unit 12 has an intermediate plate 28 which abuts an end face 29 of the sleeve 19 and forms with the same an interface. A second end face 31 of the sleeve 19 abuts a spacing ring 32 which is located in the chamber 25 and which in turn abuts the valve housing 13. A biasing spring 46 accommodated in the chamber 25, extends through a center opening in the spacer ring 32, so as to be guided and held by the same.

The valve element 21 is located in a centrally extending passage 33 of the sleeve 19, which passage extends from one to the other of the end faces 29 and 31 of the sleeve 19, and terminates at these end faces in respective recesses 34. At the end face facing away from the closed end of the passage 18, that is the bore 33 is formed at the juncture with the enlarged portion or recess 34 with a valve seat 35. A bore 36 is formed in the sleeve 19 communicating the recesses 34 with one another, and an inclined bore 37, communicates the channel 23 with the bore 33 in a region which is closer to the valve seat 35 than to the spring 46; i.e. the bore 37 is slanted in the direction towards the end face 29. A pair of O-rings 38 is received in outer circumferential grooves of the sleeve 19, sealing the channel 23 with respect to the chamber 24 and to a further chamber 39 which is defined between the valve assembly 22 and the drive unit 12.

As FIG. 1 shows, the valve element 21 has two portions, namely a portion 41 and a piston-like portion 42 which is rigidly connected with the portion 41, by being appropriately secured to it or by being of one piece with it. The length over which the piston 42 is guided in the center bore 33 of the sleeve 19 is a multiple of the diameter of the portion 42, at least twice as great as the diameter, in order to obtain not only proper guidance for the portion 42 but also to provide a good sealing effect. A sealing surface 43 is provided on the portion 41 and has an effective diameter which is only slightly greater than the diameter of the portion 42, so that both a static and dynamic pressure equalization of a high degree of effectiveness is obtained. A contact face 44 is provided on the portion 41 also and is so dimensioned that it can contact either the plate 28 or the spacer ring 32, depending upon the orientation which the valve element 21 assumes in the housing 13, and which will be discussed subsequently. The spring 46 acts upon an abutment face 45 of the portions 42 and is, as pointed out previously, guided in the opening 47 of the ring 32.

The axial length of the portions 41 and 42, i.e. of the valve element 21, intermediate the surfaces 44 and 45 thereof, is smaller than the length of the sleeve 19 intermediate the surfaces 29 and 31 thereof, by a distance corresponding to the stroke of the valve element, that is the distance which the valve element traverses between its valve opening and valve closing positions.

The plate 28 has a planar surface 48 which forms with the surfaces 29 and 44 an interface in the plane of which the free contact face at the left-hand end (in FIG. 1) of a plunger 49 is located, the plunge constituting a part of the electromagnetic drive of which the armature 51 is shown. The armature is of the type that pushes rather than pulls against the plunger 49.

Because the valve unit 11 and the drive unit 12 are discrete components which can be connected with and disconnected from one another, because of the manner in which they met at the surface 48, it is not necessary to perform any adjusting movements to adjust the various movable components with reference to one another. Moreover, a defective valve unit 11 or a defective drive unit 12 can be simply and readily exchanged for another with this arrangement merely by disconnecting it from the still operative unit (either drive unit or the valve unit) and replacing it.

When the valve is assembled as shown in FIG. 1, it is operative as a normally open valve, meaning that when the electromagnet is not energized the ports 15 and 16 are in open communication with one another. When the electromagnet is energized to armature 51 moves towards the left, pushing the plunger 49 in the same direction and thus shifting the valve element 21 to the left counter to the biasing force of the spring 46 until it engages the valve seat 35 and closes the communication between the two ports 15 and 16. We have found that the electromagnetic valve according to the present invention operates with response times of only a few milliseconds and that the length of the strokes of the valve element 21 can be measured in fractions of a millimeter.

In normal use, the port 15 will be connected with the supply conduit, and the port 16 with the user conduit, in which case the valve element 21 is largely pressure-equalized in static as well as dynamic respect, a feature which is particularly important in valves of this type. It is emphasized, however, that if the connections are reversed, that is if the port 15 is connected with a user conduit and the port 16 with a supply conduit, the valve according to the present invention will nevertheless continue to operate properly in contradistinction with similar valves known from the prior art.

Figure 2:
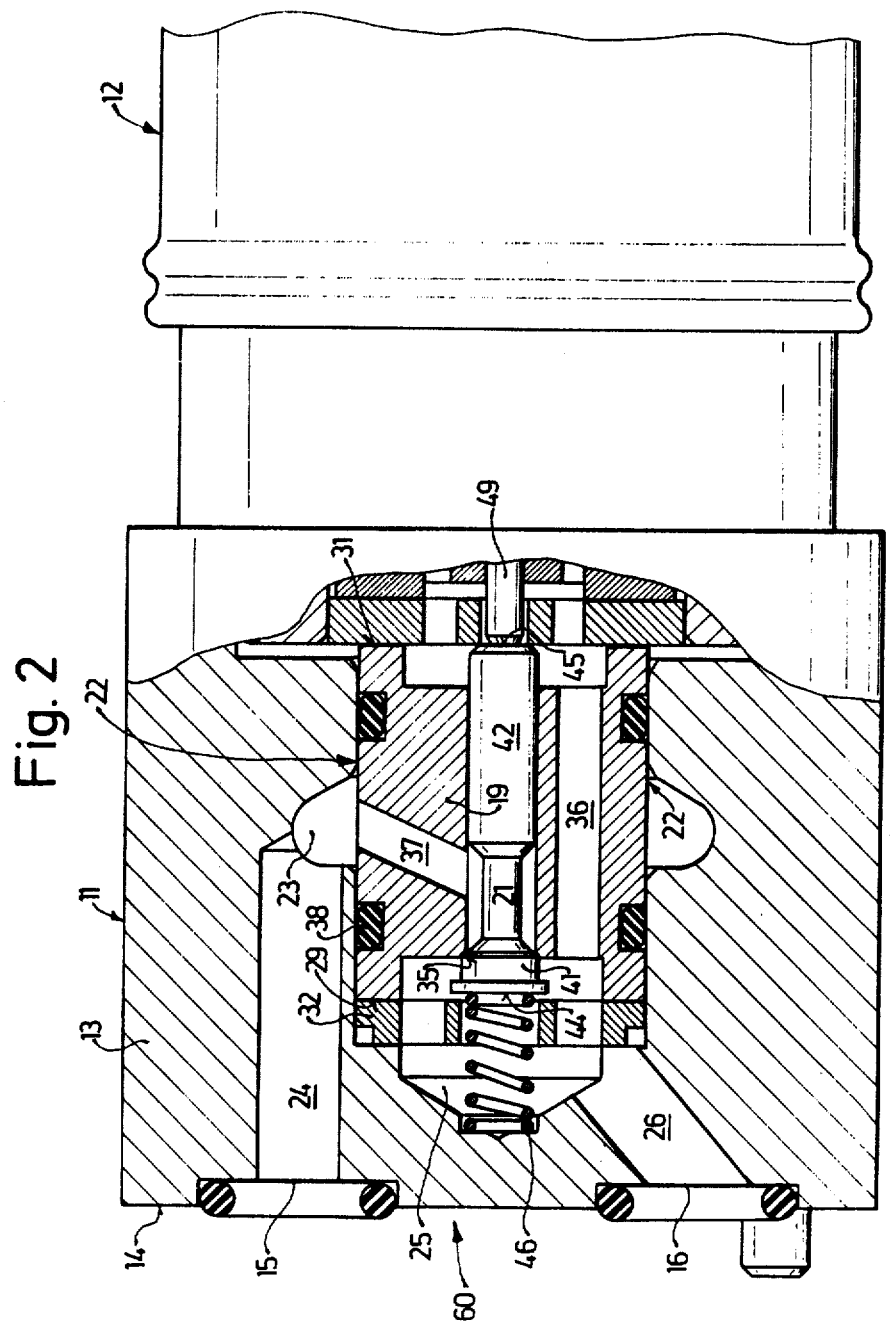
FIG. 2 is a view similar to FIG. 1, but showing the same valve assembled so as to have a normally closed configuration.

FIG. 2 shows the valve of FIG. 1, but assembled to act as a normally closed valve. Because of this difference, the valve has been identified in toto with reference numeral 60 in FIG. 2. It will be seen that the valve assembly 22 composed of the sleeve 19 and the valve element 21 has been turned end-for-end with respect to its positioning in FIG. 1. When the valve is assembled in this manner, and the electromagnetic drive is not energized, then the portion 41 will normally be in engagement with the valve seat 35 under the biasing force exerted by the spring 46. In so doing, it interrupts the communication between the ports 15 and 16. When the valve element 21 is shifted to the left in response to energization of the electromagnetic drive, then the portion 41 moves out of engagement with the valve seat 35 until abuts with its surface 44 against the spacer ring 32; the communication between the ports 15 and 16 is now open.

Figure 3:
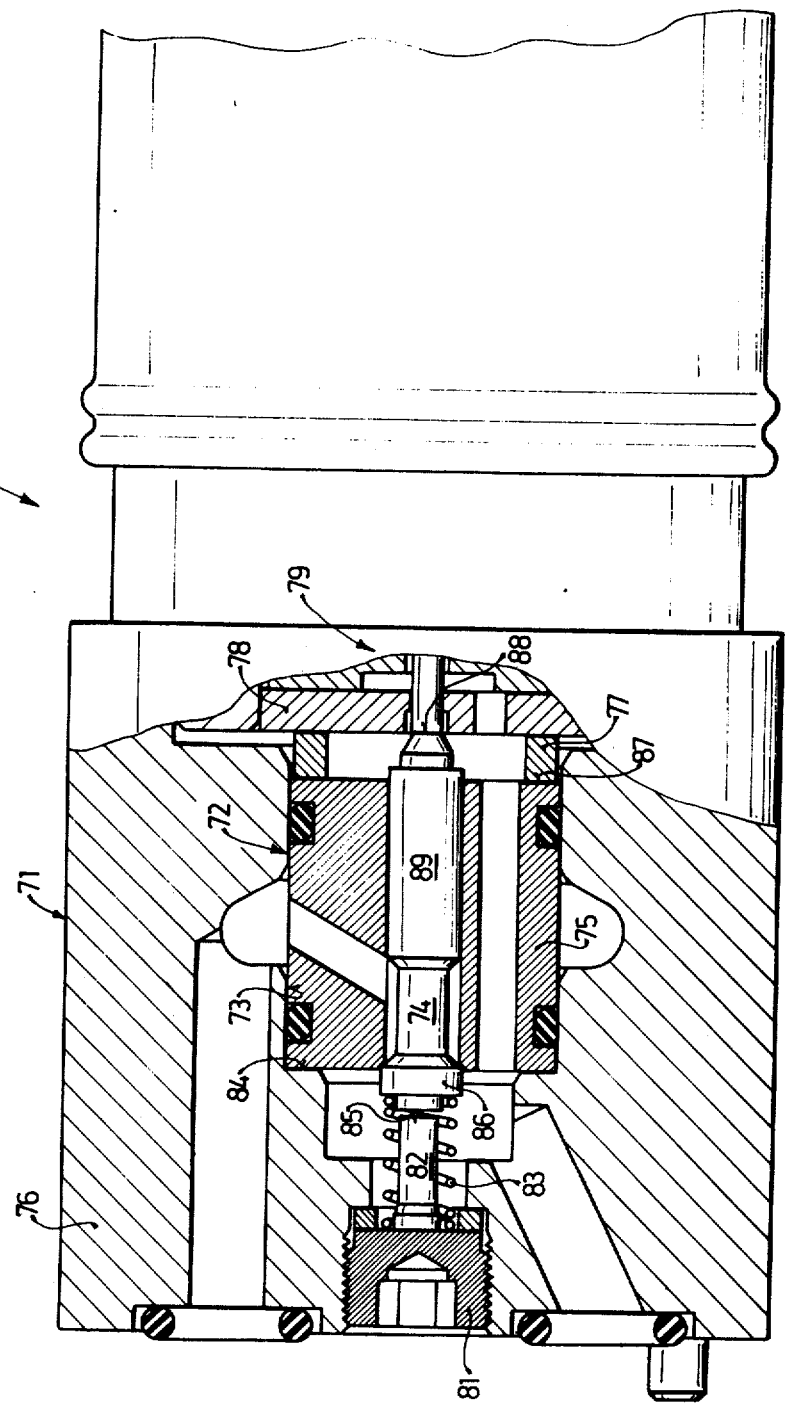
FIG. 3 is a view similar to FIG. 2 but illustrating a further embodiment of the invention.

FIG. 3, finally illustrates a further embodiment of the invention wherein the valve in toto is identified with reference numeral 70. The valve unit is here identified with reference numeral 71 and provided with a valve assembly 72 which is accommodated in a blind bore 73. In this embodiment, however, the length of the valve element 74 is greater than the length of its associated sleeve 75, the latter being directly in abutment with the valve housing 76 at one end, and at its other end abutting an intermediate plate 78 of the drive unit 79 via a spacer ring 77.

The ports are provided as in the preceding embodiment, but in the same end face where the ports are located there is provided a bore communicating with the blind bore 73 and closed by a plug 81 from which an abutment bolt or pin 82 extends axially into the blind bore 73. A helical spring 83 surrounds and is guided on the pin 82. In this embodiment also, the distance between the surfaces 84 of the sleeve 75 and 85 of the portion 86 of the valve element 74 is smaller by the stroke of the valve element 74 than the spacing between a surface 87 on the sleeve 75 and a surface 88 on the portion 89 of the valve element 74.

In this embbodiment, the same reversal of the valve assembly 82 can be carried out as in FIGS. 1 and 2; it is merely necessary to keep in mind that the spacer ring 77 must stay in its illustrated position, that is it must not be shifted.

It should finally still be pointed out that it is of course possible to construct the respective valve element so that it is completely statically pressure-equalized, if dynamic pressure equalization is not required or desired.

It will be understood that each of the elements described above, or two or more together, may also find a useful application in other types of constructions, differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An electromagnetic valve, comprising a valve unit including a valve housing formed with an interior passage which communicates with an inlet opening and an outlet opening; a biasing spring in said valve housing; a valve assembly, including valve seat means having a single valve seat interposed in said passage, and a valve element biased by said biasing spring and shiftably accommodated in said passage, said valve assembly being positionable in said passage in one orientation in which said valve element is permanently biased into engagement with said single valve seat and in another orientation in which said valve element is permanently biased out of engagement with said single valve seat; and a drive unit including a drive housing removably connected with said valve housing, and electromagnetic drive means in said drive housing and operative, when energized, for shifting said valve element in said passage counter to the biasing force of said spring.

2. A valve assembly as defined in claim 1, wherein said valve housing has two spaced axial ends, said spring being located in the region inwardly adjacent one of said ends and said drive housing being connected with said valve housing in the region of the other of said ends.

3. A valve assembly as defined in claim 1, wherein said valve assembly comprises a sleeve located in said passage extending axially of and having an interior which communicates with the same, said sleeve having a first end face and an axially spaced second end face, and said valve seat being formed in a side of the sleeve associated with said second end face; and wherein said valve element extends into said interior of said sleeve and includes a first portion adapted for sealing engagement with said valve seat, and a second portion rigid with said first portion and extending in said interior of said sleeve toward said first end face, each of said portions having an axially directed abutment face which faces axially away from said sleeve.

4. A valve assembly as defined in claim 3, wherein said valve element is movable through a given distance between a valve-seat engaging position and a valve-seat disengaging position; and wherein the spacing between said abutment faces is smaller than the spacing between said end faces by said given distance.

5. A valve assembly as defined in claim 3, wherein said sleeve has a center bore extending from one to the other of said end faces and in which said second portion is located, and a transverse bore extending from a location on the outer circumference of said sleeve to said center bore and being inclined in direction towards said second end face.

6. A valve assembly as defined in claim 3, wherein said first portion has a sealing surface for sealing engagement with said valve seat; and wherein said second portion has a diameter which is only slightly smaller than the diameter of said sealing surface.

7. A valve assembly as defined in claim 3, wherein said sleeve has a center bore bounded by an inner circumferential surface; and wherein said second portion is accommodated in said center bore and is guided by said inner circumferential surface over an axial distance which is at least twice as great as the diameter of said second portion.

8. A valve assembly as defined in claim 1, wherein said valve housing has two spaced axial terminal faces, said inlet and said outlet being provided in one of said terminal faces, and said passage being a blind bore which extends from said other terminal face inwardly towards said one terminal face; and wherein said drive housing is connected to said other terminal face.

9. An electromagnetic valve, comprising a valve unit including a valve housing formed with an interior passage which communicates with an inlet opening and an outlet opening; a biasing spring in said valve housing, said valve housing having two spaced axial terminal faces, and said passage extending inwardly from one toward the other of said terminal faces and having a closed end portion in which said spring is located, and further comprising a spacer ring located in said closed end portion and bearing upon said valve housing and said first end face, said spring extending through and being positioned by said spacer ring; a valve assembly, including a valve seat means interposed in said passage, and a valve element biased by said biasing spring and shiftably accommodated in said passage, said valve assembly being positionable in said passage in one orientation in which said valve element is permanently biased into engagement with said valve seat means and in another orientation in which said valve element is permanently biased out of engagement with said valve seat means, said valve assembly comprising a sleeve located in said passage extending axially of and having an interior which communicates with the same, said sleeve having a first end face and an axially spaced second end face, and said valve seat means including a valve seat formed in a side of the sleeve associated with said second end face, said valve element extending into said interior of said sleeve and including a first portion adapted for sealing engagement with said valve seat, and a second portion rigid with said first portion and extending in said interior of said sleece toward said first end face, each of said portions having an axially directed abutment face which faces axially away from said sleeve; and a drive unit including a drive housing removably connected with said valve housing, and electromagnetic drive means in said drive housing and operative, when energized, for shifting said valve element in said passage counter to the biasing force of said spring.

10. A valve assembly as defined in claim 9, wherein said drive unit includes an abutment plate which abuts said second end face of said sleeve and is provided with an aperture, said drive means including a plunger which extends through said aperture for engagement with the axially directed abutment face of said first portion.

11. A valve assembly as defined in claim 10, wherein said abutment plate and said second end face form with one another an interface; and wherein said plunger has a free contact face; said contact face and one of said abutment faces being located in the plane of said interface when said drive means is in de-energized condition.

12. An electromagnetic valve, comprising a valve unit including a valve housing formed with an interior passage which communicates with an inlet opening and an outlet opening; a biasing spring in said valve housing; a valve assembly, including valve seat means interposed in said passage, and a valve element biased by said biasing spring and shiftably accommodated in said passage, said valve assembly being positionable in said passage in one orientation in which said valve element is permanently biased into engagement with said valve seat means and in another orientation in which said valve element is permanently biased out of engagement with said valve seat means, said valve assembly comprising a sleeve located in said passage extending axially of and having an interior which communicates with the same, said sleeve having a first end face and an axially spaced second end face ad defining at its opposite axial ends respective chambers which are connected by an equalizing bore formed in said sleeve that communicates said chambers with one another, and said valve seat means including a valve seat formed in a side of the sleeve associated with said second end face, said valve element extending into said interior of said sleeve and including a first portion adapted for sealing engagement with said valve seat, and a second portion rigid with said first portion and extending in said interior of said sleeve toward said first end face, each of said portions having an axially directed abutment face which faces axially away from said sleeve; and a drive unit including a drive housing removably connected with said valve housing, and electromagnetic drive means in said drive housing and operative, when energized, for shifting said valve element in said passage counter to the biasing force of said spring.

13. A valve assembly as defined in claim 12, wherein said passage is a blind bore extending from said second end face inwardly toward said first end face, and said sleeve is formed with a connecting bore connecting said passage with said interior of said sleeve, said passage being formed with an annular channel in the region where said bores communicate; and wherein one of said openings communicates with said annular channel and the other of said openings communicates with the chamber defined between said sleeve and valve housing.

14. A valve assembly as defined in claim 1, wherein said passage has a longitudinal axis; and wherein said openings are substantially located on a circle surrounding said axis.

15. A valve assembly as defined in claim 3, wherein said valve element is movable through a given distance between a valve-seat engaging position and a valve-seat disengaging position; and wherein the spacing between the abutment face of said second portion and said first end face differs from the spacing between the abutment face of said first portion and said second end face by said given distance.

* * * * *